United States Patent [19]

Toyofuku

[11] Patent Number: 5,214,294
[45] Date of Patent: May 25, 1993

[54] SCAN READING METHOD INCLUDING DENSITY MEASURING AND EDGE DETECTION

[75] Inventor: Takashi Toyofuku, Kanagawa, Japan

[73] Assignee: Fuji Photo Film Co., Ltd., Kanagawa, Japan

[21] Appl. No.: 871,317

[22] Filed: Apr. 20, 1992

[30] Foreign Application Priority Data

Apr. 19, 1991 [JP] Japan ................... 3-088783
Jun. 14, 1991 [JP] Japan ................... 3-143383

[51] Int. Cl.$^5$ .......................... G01N 21/86
[52] U.S. Cl. ....................... 250/561; 250/234
[58] Field of Search ........... 250/561, 234, 235, 236; 356/443, 444; 385/494

[56] References Cited

U.S. PATENT DOCUMENTS 4,864,149 9/1989 Matsumoto ............... 250/561

Primary Examiner—David C. Nelms
Attorney, Agent, or Firm—Sughrue, Mion, Zinn, Macpeak & Seas

[57] ABSTRACT

A scan reading method according to this invention includes the steps of: causing a line memory to store original image data for one line; obtaining a density average value of the one-line image data or a variation rate thereof; and detecting the edge of the original by comparing the average density value or the variation rate thereof with a predetermined threshold value after finishing a scan over the original or during the scan. A scan reading method also includes the steps of: preparing a density histogram from the one line image data in the original region; optionally obtaining the average density value of the variation rate thereof; detecting the top end and terminal of the original from that value; and calculating highlight and shadow densities from the density histograms after finishing the scan over the original by use of a scanner. Based on the methods of the present invention, it is therefore possible to automatically detect the edge of the original and perform a density auto-measurement at low costs with a high accuracy with the aid of a small capacity line memory without adding a multiplicity of sensors and incorporating a large capacity buffer memory.

19 Claims, 7 Drawing Sheets

SCAN READING METHOD INCLUDING DENSITY MEASURING AND EDGE DETECTION

BACKGROUND OF THE INVENTION

The present invention relates generally to a scan reading method of detecting an edge or both edges of an original and performing a density auto-measurement. More particularly, to the scan reading method of automatically detecting the edge or edges of the original mounted on a platen of an image reader using a scanner, i.e., the top end and terminal of the original or both ends thereof in a scan direction of the scanner, and of automatically measuring a density of the original, especially densities of highlight and shadow portions of the original.

The image reader for scan-reading an image of the original mounted on the platen (the original mount) has been employed for a variety of image forming apparatuses such as a printing plate making apparatus, a copying apparatus, etc.

In such an image reader, the original on the platen is irradiated with the light of a light source extending in a one-dimensional direction, e.g., a fluorescent lamp and an LED array light source, or the light emitted from a light source and deflected in the one-dimensional direction, e.g., the laser beam emitted from a laser light source deflected by an light deflector. The reflected light therefrom is further reflected by a plurality of mirrors in predetermined directions and penetrates a projection lens. An image is formed on a solid-state imaging element such as a CCD or the like disposed in a predetermined position. This solid-state imaging element effects a photoelectric conversion into electric signals, and image data of the original are obtained in the form of, e.g., density signals.

The thus obtained original image data are subjected to a variety of processes in an image processing device of the above-described image forming apparatus such as the printing plate making apparatus. The original image data are thereafter transmitted to an image recording device, wherein light beams emitted from the laser or the like are modulated. The light beams modulated corresponding to the image data are reflectively deflected in a main scan direction by a light deflector such as a resonant scanner, a galvanometer mirror, etc. A recording material transported at a constant velocity in a subscan direction substantially orthogonal to the main scan direction is two-dimensionally scan exposed to the light beams, thus performing image recording. A reproductive image is thereby obtained.

In the image forming apparatus such as the copying apparatus and the printing plate making apparatus, a photosensitive material or a paper having a desired or predetermined cut size must be selected for obtaining the reproductive image having a desired or predetermined image forming size in accordance with scale factors (of equalization, enlargement and contraction) and a size of the original. Further, there arises a necessity for cutting the paper and the photosensitive material in the above mentioned cut size. For this reason, the user has hitherto manually inputted the size of the original or manually inputted the edges of the original by use of a digitizer when the size is not fixed. This is troublesome. For instance, the manual input is extremely troublesome, especially when the original is not fixed in terms of size. This causes the operability of the apparatus to be deteriorated.

To improve this situation, in the image forming apparatus which often uses the fixed-size original and paper as in a black and white copying apparatus, for instance, a multiplicity of sensors are attached to the scanner along the periphery of the platen or under the platen. Detected thereby is a size of the original to be placed on the platen which is carried onto the platen directly or through an automatic document feeder (ADF) installed on the platen. In this system, however, with an intention of increasing an accuracy of a detection result, a tremendously large number of sensors are required. This also presents a problem where it is difficult to accurately detect the edges of the unfixed-size original.

On the other hand, for the purpose of corresponding to the unfixed sizes, in some of the printing plate making appazatuses, the user inputs the edge of the original to the image reading device by depressing a slide button after sliding the slide button up to the edge of the original on the platen. Nevertheless, this operation still requires manual input by the user. This results in the problems where the operation is troublesome, and the operability is bad.

Further, in the image forming apparatus such as the copying apparatus and the printing plate making apparatus, a continuous tone (gradation) image of the original is, after being converted into electric signals by use of a solid-state imaging element such as a CCD or the like, reproduced on a photosensitive material such as a film, etc. In this case, noises probably enter the reproductive image depending on characteristics of the foregoing solid-state imaging element. If noises enter the reproductive image, the harshness and unevenness are produced in the reproductive image. The reproductive image may not fit for viewing. In particular, a human visual perception exhibits a property approximate to the logarithm with respect to the brightness. Hence, even when the same amount of noises enter a shadow portion with a high density and a highlight portion with a low density of the continuous gradation image of the original, a large noise level thereof is sensed in the shadow portion with the high density. This is a factor which adds to the deterioration of image quantity. Known for reducing such visible noises is an image processing method of averaging the image signals as electric signals.

In the case of inputting by averaging the whole density levels of the continuous gradation image of the original, the reduction in noises is attained. However, an inconvenience is caused, wherein a resolution in the highlight portion deteriorates. Namely, the human visual perception exhibits such a characteristic that a spatial resolving power is low in the shadow portion of the continuous gradation image of the original, whereas the resolving power is high in the highlight portion. Therefore, it follows that the visible noises are preferably reduced in the shadow portion, but the resolving power deteriorates in the highlight portion.

To cope with this, in the highlight and shadow portions of the image of the original, the noises are reduced in a broad range extending from the shadow portion with the high density to the highlight portion with the low density in the reproductive image by changing the method of image processing such as an averaging process of the image data obtained, a smoothing process (unsharpness process) and a sharpening process (sharpness process). The unevenness and harshness are thereby eliminated. Specifically, this intends to prevent both a deterioration of the sharpness of the edge on the high density side and unnaturalness to the image with a gradual variation in density. Additionally, for controlling a pictorial gradation of a finished copy, the user inputs the densities of the highlight and shadow portions or effects sampling of the image density by scanning the original. A density histogram is thereafter prepared, and the highlight and shadow densities are automatically detected.

In the conventional density auto-measurement, when preparing the histogram, the image data for a sheet of read original (and after "lines") or at least several lines, are at once taken into a buffer and a frame memory. The histogram is then prepared. For this reason, a tremendous memory is needed as a buffer for the image data. This brings about an increment in costs of the image processor and in turn of the image reader and the printing plate making apparatus.

BRIEF SUMMARY OF THE INVENTION

It is a first object of the present invention, which obviates the problems inherent in the prior art described above, to provide a scan reading method of detecting an edge of an original, the method being capable of detecting subscan directional edges, i.e., a top end, terminal or both ends of the original on a platen, by processing image data read by a prescan simply by effecting the prescan of an image of the original with a scanner without attaching new parts such as sensors and the like in an image reader for continuously photoelectrically reading the image of the original mounted on the platen per line in a main scan direction by means of the scanner which moves relatively to the original.

Further, it is a second object of the present invention to provide a scan reading method for a density auto-measurement, which is intended to actualize the density auto-measurement at low costs simply by incorporating a line memory for storing main scan directional one-line image density data without having a large capacity memory, the method comprising the steps of: prescanning the original image with the scanner; taking main scan directional only-one-line original image density data read by the prescan into the line memory; preparing a histogram per line by reading the image data stored in this line memory, repeating the preparation thereof with respect to a subscan trimming range or an original region (from the top end to the terminal); and thereafter calculating densities of highlight and shadow portions.

To achieve the above-described first object, there is provided by the first embodiment of the first aspect of the present invention a scan reading method of detecting an edge of an original by which said original mounted on a platen and a scanner including a light source for illuminating said original sequentially or simultaneously in a main scan direction are relatively moved in a subscan direction substantially orthogonal to said main scan direction and an image of said original is photoelectrically read at each pixel by two-dimensionally scanning said original, and then at least one edge of said original in said subscan direction is detected, comprising the steps of:

taking one-line image density data in said main scan direction of said scanner in a predetermined position in said subscan direction, averaging said one-line image density data in said main scan direction to take an average density value of said line by;

plotting said average density value in said subscan position on a density distribution chart in said subscan direction;

repeating the plotting process from a subscan start point on the side of one end of said platen to a subscan end point on the side of the other end thereof in accordance with scanning of said scanner;

obtaining said density distribution chart in said subscan direction;

searching thereafter said density distribution chart; and detecting at least one edge of said original by means of judging that a line where said average density value is less than a predetermined threshold value is positioned outside an original region.

Preferably, at least one-line of a first line in which said average density value does not become less than said threshold value after a plurality of lines in which said average density value is less than said threshold value have continued and a first line in which said average density value is less than said threshold value after a plurality of lines in which said average density value equals said threshold value or greater have continued is detected as the edge portion of said original.

Preferably, when a predetermined number of lines in which said average density value is less than said threshold value continue, these lines are judged as an area being out of the original region to detect the edge portion of said original.

There is provided by the second embodiment of the first aspect of the present invention a scan reading method of detecting an edge of an original, by which said original mounted on a platen and a scanner including a light source for illuminating said original sequentially or simultaneously in a main scan direction are relatively moved in a subscan direction substantially orthogonal to said main scan direction and an image of said original is photoelectrically read at each pixel by two-dimensionally scanning said original, and then at least one edge of said original in said subscan direction is detected, comprising the steps of:

taking one-line image density data in said main scan direction of said scanner in a predetermined position in said subscan direction;

averaging said one-line image density data in said main scan direction to take an average density value of said line by calculating a variation rate of said line or one of a plurality of lines provided in front of said line by using said average density value data of a predetermined number of lines;

repeating the calculation from a subscan start point on the side of one end of said platen to a subscan end point on the side of the other end thereof in accordance with scanning of said scanner;

completing a distribution chart of said variation rate with respect to said subscan position;

searching thereafter said variation rate distribution chart; and detecting the edges of said original by judging that a line in which an absolute value of said variation rate is less than a predetermined infinitesimal value is out of the original region.

Preferably, at least one line of a first line in which said absolute value of said variation rate exceeds said infinitesimal value after a plurality of lines in which said absolute value of said variation rate is less than said infinitesimal value have continued and a first line in which said absolute value becomes less than said infinitesimal value after a plurality of lines in which said absolute value of said variation rate is said infinitesimal value or greater have continued is detected as the edge portion of said original.

Preferably, when a predetermined number of lines in which said absolute value of said variation rate is less than a predetermined infinitesimal value continue, these lines are judged as an area being out of the original region to detect the edge portion of said original.

Preferably, in the first aspect of the present invention, said one-line image density data in said main scan direction are image density data which are thinned out by a predetermined method.

Preferably, said one-line image density data in said main scan direction are image density data within an effective image area in said main scan direction.

To achieve the second object, there is provided by the second aspect of the present invention a scan reading method for a density auto measurement, automatically measuring an original image density by executing a prescan in a subscan direction with a scanner for reading a one-line image density of an original mounted on a platen at each pixel in a main scan direction, comprising the steps of:

taking, into a line memory, one-line image density data in said main scan direction which have been photoelectrically read by use of said scanner;

preparing a density histogram of said image density data of a previously specified main scan trimming range from said one-line image density data taken into said line memory;

storing said histogram in a main memory;

repeating the storage process with respect to a previously specified subscan trimming range to complete said histogram of the entire subscan trimming range; and calculating thereafter highlight and shadow densities by use of said histogram.

Preferably, said one-line image density data in said main scan direction are image data which are thinned out by a predetermined method.

To achieve both objects, there is provided by the third aspect of the present invention a scan reading method for a density auto-measurement, of automatically measuring an original image density by executing a prescan in a subscan direction with a scanner for reading a one-line image density of an original mounted on a platen at each pixel in a main scan direction, comprising the steps of:

taking, into a line memory, one-line image density data in said main scan direction which have been photoelectrically read by use of said scanner;

calculating an average density value of said line by averaging said one-line image density data taken into said line memory with respect to an effective image area in said main scan direction;

making a discrimination of an original region from said average density value;

trimming said one-line image density data taken into said line memory in said main scan direction when said line is within said original region;

preparing thereafter a density histogram of said image density data of said main scan trimming range;

storing said density histogram in a main memory;

repeating the storage process with respect to said entire original region to complete said histogram of the entire original region;

calculating thereafter highlight and shadow densities by use of said histogram; and detecting at least one edge of said original.

Preferably, said one-line image density data in said main scan direction are image density data which are thinned out by a predetermined method.

Preferably, said original region is detected by judging that a line in which said average density value is less than a predetermined density value, or that an absolute value of a variation rate of said average density value is less than a predetermined infinitesimal value is out of the original region.

Preferably, when a predetermined number of lines in which said average density value is less than said predetermined density value, or said absolute value of said variation rate of said density average value is less than said predetermined infinitesimal value continue, these lines are judged as an area being out of the original region.

Preferably, when the difference between a maximum value and a minimum value of said one-line image density data is smaller than predetermined values, and when said average density value of said one line is less than said predetermined density value or said absolute value of said variation rate of said average density value of said one-line is less than said predetermined infinitesimal value, it is judged that this one-line is out of the original region.

Preferably, said main scan directional trimming range is determined from said main scan one-line image density data value at each pixel within said line memory by eliminating pixel points at which said image density data value is less than said predetermined density value, or said absolute value of said variation rate of said image density data value is less than said predetermined infinitesimal value.

Preferably, said main scan directional trimming range is determined depending on a first pixel point at which said image density data value becomes larger than said predetermined density value, or an absolute value of said image density data value becomes larger than said predetermined infinitesimal value, and a first pixel point at which said data value is less than said predetermined density value, or said absolute value is less than said predetermined infinitesimal value.

BRIEF DESCRIPTION OF THE DRAWINGS

Other objects and advantages of the present invention will become apparent during the following discussion taken in conjunction with the accompanying drawings, in which.

DETAILED DESCRIPTION OF THE INVENTION

Figure 1:
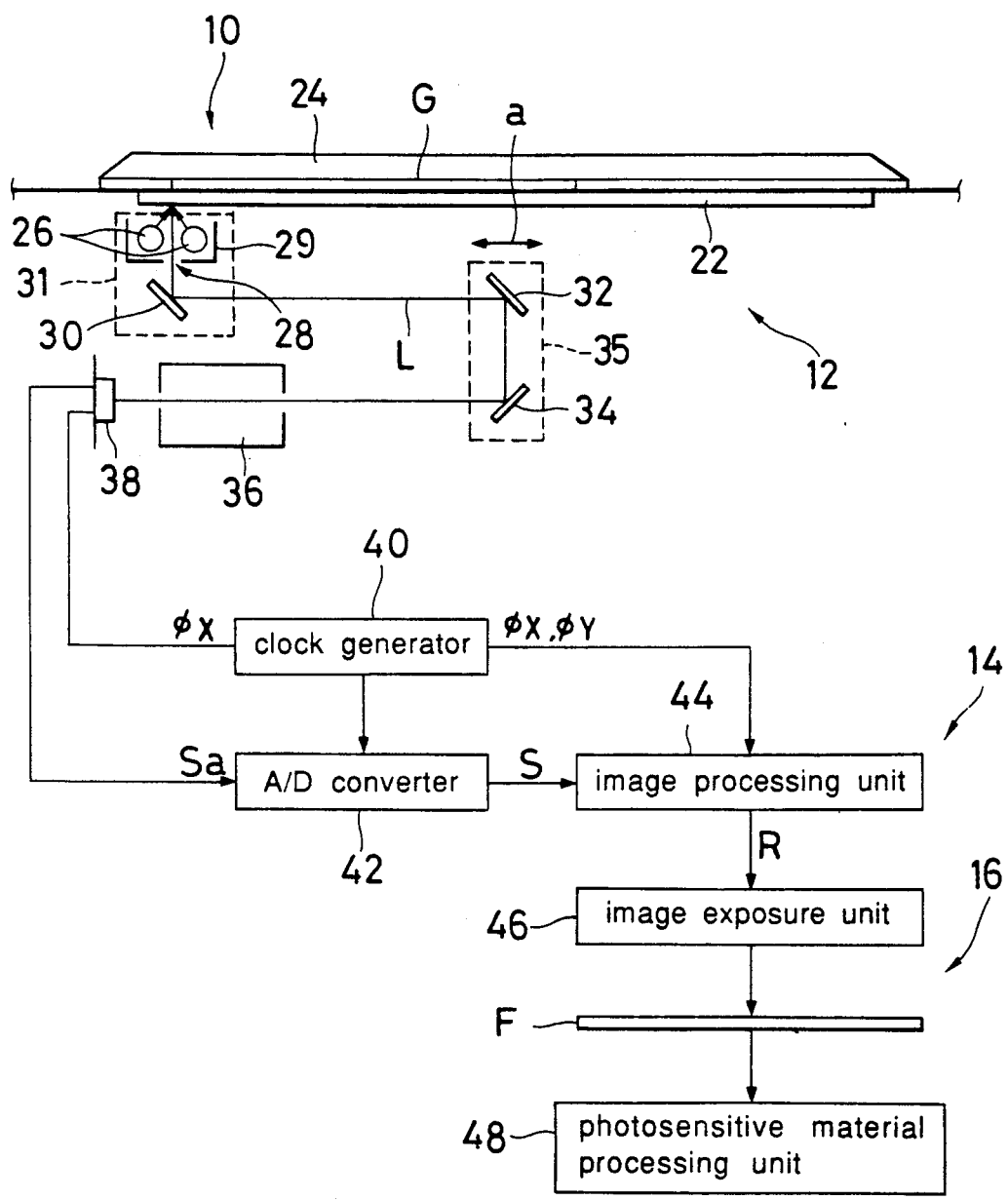
FIG. 1 is a schematic view showing one embodiment of a printing plate making apparatus for embodying a scan reading method of detecting the edge of an original and measuring a density thereof according to the present invention.

A scan reading method of an original according to the present invention will hereinafter be described in detail.

In the scan reading method of detecting the edge of the original in a first aspect of the present invention, the original mounted on a platen is irradiated with the light sequentially or simultaneously in a main scan direction from a light source of a scanner. A solid-state imaging element such as a CCD or the like photoelectrically reads the main scan directional one-line image data upon receiving the reflected light from the original. The average density value data is computed by averaging the one-line image data or only the effective image data corresponding to the above-described original image among the one-line image data. Next, the average density value data with respect to a subscan position of a particular line is plotted on the average density value distribution chart in the subscan direction. Alternatively, a variation rate of the average density value from the average density value data for several lines is plotted on a variation rate distribution chart. These plotting processes are repeated from a subscan start point of the platen to an end point thereof while moving the scanner, thus completing the average density value distribution chart and the variation rate distribution chart. Thereafter, the distribution charts are searched. In the case of the average density value distribution chart, when a predetermined number of lines in which the average density value equals a predetermined threshold value or smaller, or in the case of the variation rate distribution chart, when a predetermined number of lines in which an absolute value of the variation rate is a predetermined infinitesimal value deemed as 0 or smaller, this is judged as an area being out of an original region. The terminal and top end or both ends of the original in the subscan direction are thereby detected.

More specifically, for example, when the average density value equals predetermined threshold value, i.e., falls within a range of less than $\pm \alpha$ from a previously measured density of the platen surface, this implies the platen surface itself. When this continues, the portion where for the first time the value becomes different by $\pm \alpha$ or more from the density of the platen surface is defined as an edge of the original. Conversely, when a number of lines greater than the predetermined number of lines in which the average densith value falls within a range of less than the platen surface densith continue for the first, this is judged as an edge of the original. Further, with respect to the variation rate of the average density value, an edge of the original is determined when the portion where the absolute value thereof is less than the preset threshold value is adjacent to the portion where the absolute value is the threshold value or more.

Further, the above-described judgment is executed after scan-reading the entire area of the platen in the manner described above and preparing the distribution chart over the entire area. The judgment may be made simultaneously when effecting the scan.

As explained above, according to the scan reading method of detecting the edge of the original in the first aspect of the present invention, at least one edge or both edges of the original can be accurately detected even in the case of unfixed sizes simply by using the image density data read during the prescan without adding new parts such as sensors. The user is therefore able to read the original image with good operability simply by placing the original on the platen and inputting the main scan directional image region.

According to the scan reading method for the density auto-measurement in the second aspect of the present invention, the original placed on the platen is irradiated with the light emitted sequentially or simultaneously in the main scan direction from the light of the scanner. The solid-state imaging element such as the CCD or the like photoelectrically reads the main scan directional one-line image data upon receiving the reflected light from the original. The image data are then taken into the line memory. Prepared next is the density histogram of the image density data within the previously specified main directional trimming range (area) among the main scan directional one-line image density data taken into this line memory. The histogram is stored in the main memory (RAM). This histogram is prepared over the whole range from the start line to the end line of the previously specified subscan directional trimming range of the original. The results are stored. Thereafter, the highlight and shadow densities are computed from the density histograms of the entire range. These densities are stored in the main memory. The density auto-measurement is thus finished.

The thus obtained highlight and shadow densities can be employed for the main scan image processing such as, e.g., an averaging process, a smoothing process and a sharpening process. The density auto measurement based on the method of the present invention is attainable at low costs simply by using the line memory for one line in the main scan direction, because there is no necessity for temporarily taking, into the buffer, the whole image density data of the entire image reading range of a sheet of original as in the prior art.

According to the scan reading method of detecting the edge of the original and for the density auto-measurement in the third aspect of the present invention, as in the same way with the density auto-measurement in the second aspect, the one-line image density data in the main scan direction taken into the line memory are averaged with respect to the effective image range. The average density value of the line concerned is thereby calculated. The original region is judged from this average density value. For instance, if this density average value is the preset density value (including an allowance range $\pm\alpha$)—i.e., when the average density value is a density value of the platen surface or when a variation rate of this average density value is 0 (including an allowance range $\pm\beta$), the line concerned is judged as a line being out of, the original region. Based on this judgment, if the subject line is within the abovementioned original region, there is performed main scan directional trimming of the image density data of the subject line which is taken into the line memory. The density histogram of the image density, data within the main scan trimming range is prepared and stored in the main memory. The calculation of this average density value (or the variation rate thereof) and the histogram preparation effected correspondingly are performed over the entire range from the scan start line to the scan end line of the scanner. The density histograms obtained as results thereof are stored in the main memory. The density histogram is herein, as a matter of course, prepared with respect to only the original region described above. Thereafter, the highlight and shadow densities are calculated from the density histograms over the original region. These densities are stored in the main memory, thus finishing the density auto-measurement. Main scan trimming range may be herein previously specified (set); or the judgment may be made from the continuity thereof by comparing the image density data taken into the line memory.

In this manner, according to the present aspect, it is possible to detect the subscan directional original region by obtaining the average density value and simultaneously perform the density auto measurement for calculating the highlight and shadow densities. Irrespective of effecting the two operations, the buffer memory for this purpose may be a line memory for one line in the main scan Unlike the prior art, the tremendous buffer memory is unnecessary, and the costs are low. Besides, when using the main scan one-line image density value of the line memory, trimming in the main scan direction can be automatically executed.

To begin with, a scan reading method for detecting an edge of an original and a density auto measurement will hereinafter be described in detail by way of preferred embodiments shown in the accompanying drawings.

FIG. 1 is a schematic diagram illustrating a printing plate making apparatus of an image reader for embodying the scan reading method for detecting the edge of the original and the density auto measurement.

As depicted in the same Figure, a print processor 10 comprises an image reading device 12, an image processing device 14 and an image recording device 16. An image, e.g., a continuous tone image of an original G is photoelectrically read and converted into electric signals by the image reading device 12 at each line in a main scan direction (vertical to the sheet surface of the Figure) substantially orthogonal to an arrowed subscan direction a shown in the Figure while being scanned in the subscan direction a. Thereafter, the electric signals are further converted into binarized halftone image signals R by means of the image processing device 14. The halftone image signals R are exposure-recorded as a halftone image on a photosensitive material F in the image recording device 16 and reproduced by effecting a photosensitive material process.

The image reading device 12 is composed of: a platen 22, constructed of a transparent glass plate. for mounting the original G; a platen surface 24 (having an original-side surface assuming, e.g., typically black) for fixing the original G onto the platen 22; two lengths of elongate fluorescent lamps 26, 26 extending in a one-dimensional direction (main scan direction), which constitute a light source for illuminating the original G mounted on the platen 22 from underside of the platen 22; a slit 28, formed just thereunder, for transmitting reflected light L emitted from the fluorescent lamps 26, and reflected by the original G in the form of slit light having a predetermined slit width and length; a light source unit 31 composed of a casing 29 for covering the fluorescent lamps 26, 26 and a first mirror 30, disposed just under the slit 28, for reflecting a light path of the reflected light L in the subscan direction; a mirror unit 35 constructed of a second mirror 32 and a third mirror 34 which serve to reflect the light path L in the opposite direction; an image forming lens 36 for focusing and forming an image of the slit-like reflected light bearing an original image; and a CCD 38 for photoelectrically converting the main scan directional one-line original image as one block into analog electric signals by way of image density data Sa. The light source unit 31 herein constitutes a scanner according to the present invention However, when the light source unit 31 moves for scanning at a predetermined subscan speed in the subscan direction a along the lower surface of the platen 22, the mirror unit 35 also moves in the same subscan direction at a speed which is ½ the above-described subscan speed so as to equalize the length of the light path L of the reflected light from the original G up to the CCD 38 during scanning.

The CCD 38 herein photoelectrically converts the light bearing the main scan direction one-line original image and outputs the light as main scan directional one-line analog image data signals Sa. A variety of line sensors and solid-state imaging elements are usable without being limited to this CCD. The main scan directional one-line analog image data Sa read by the CCD 38 is defined as analog image data extending over an entire lengthwise area of the slit 28 in the main scan direction, i e., the analog image data of a platen main scan direction effective range. If the main scan directional length of the original G is smaller than the length of the slit 28, the image data contain data other than the original image data, e.g., even data associated with the underside of the original cover 24.

Further, the light source for illuminating one line in the main scan direction is not limited to the one like the illustrated elongate fluorescent lamp 26 for simultaneously illuminating the main scan directional one line. The original G may be sequentially illuminated with laser beams by deflecting the laser beams emitted from the light source in the main scan direction by use of a laser light source and a light deflector. Moreover, the original G is fixed onto the platen 22 and may be subscan-carried as it remains mounted on the platen 22 instead of subscan-moving the light source.

The image processing device 14 is composed of: a clock generator 40 for generating main scan clocks $\phi x$ for determining a timing of reading the main scan-directional one-line image data from the CCD 38; an A/D converter 42 for converting the analog image data signals Sa read from the CCD 38 on the basis of the main scan clocks $\phi x$ into image data signals S as digital signals after effecting an analog correction such as a gain correction; and an image processing unit 44 for executing the method of detecting at least one edge of the original and the scan reading method for the density auto-measurement according to the present invention during a prescan by use of the image data signals S, and for simultaneously outputting the signals S to the image recording device 16 finally as halftone (dot) image signals by image processing the signals S during a substantial scan. The image processing unit 44 is herein the most characteristic component of the present invention. In this image processing unit 44, corrections such as a shading correction and a dark correction of the CCD with respect to the foregoing image signals S on the basis of the main scan clock signals $\phi x$ and subscan clock signals $\phi y$ which are given from the clock generator 40. Thereafter, as will be discussed later, the edge of the original of the present invention is detected by effecting a thin-out process during the prescan; or alternatively the density is automatically measured. On the other hand, during the substantial scan, there are executed the image processing such as a logarithm transform process, a gradation transform process, a smoothing process, a sharpening process and a halftone process. The signals are outputted as binarized dot (halftone) image signals R to the image recording device 16.

The image recording device 16 is constructed of: an image exposure unit 46 for converting the above described dot image signals R into photo signals of the laser beams or the like, effecting the exposure by leading the photo signals onto a photosensitive material F and recording a halftone image; and a photosensitive material processing unit 48 for regenerating the original image as a halftone image by developing and fixing the exposed photosensitive material. The photosensitive material processing unit 48 is herein not necessarily provided as one united body. The exposed photosensitive material F may also be processed by other photosensitive material processors.

Figure 2:
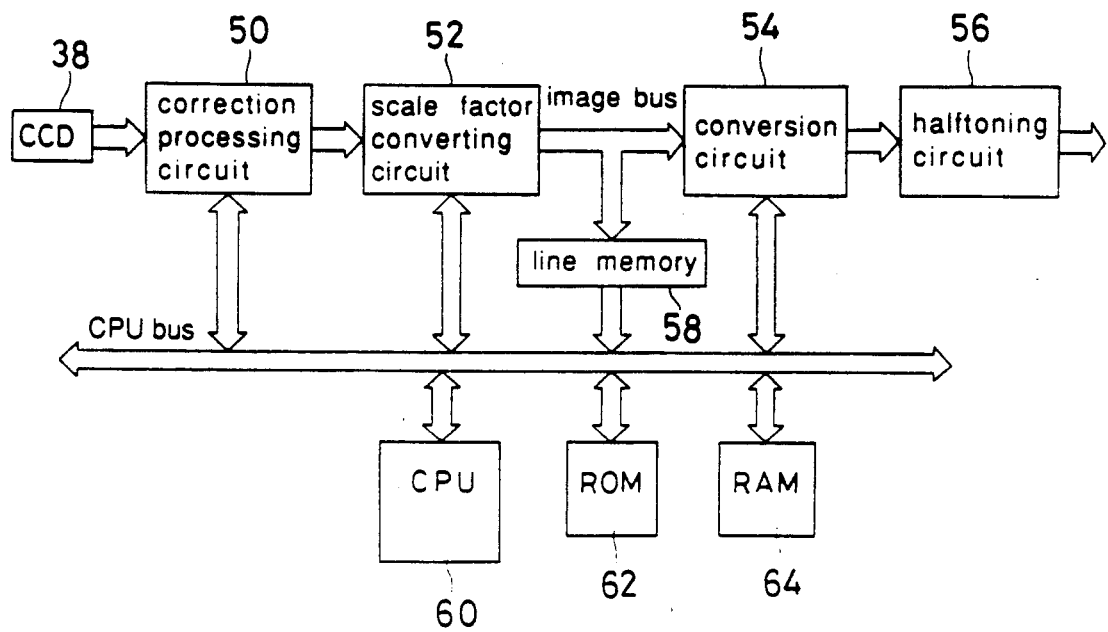
FIG. 2 is a block diagram showing one embodiment of an image processing device of the printing plate making apparatus illustrated in FIG. 1.

FIG. 2 illustrates a construction of the image processing unit 44 of FIG. 1. In this case, the image processing unit 44 includes: a correction processing circuit 50, a scale factor converting (thin-out processing) circuit 52, a conversion circuit 54 and a halftoning circuit 56 to which the image data flow via an image bus; a line memory 58 led from the image bus between the scale factor converting circuit 52 and the conversion circuit 54 and further connected to a CPU bus; and a CPU 60, a ROM 61 and a RAM 64 for transferring and receiving the information through the CPU bus. A variety of image processes are effected by connecting the correction circuit 50, the scale factor converting circuit 52, the conversion circuit 54 and the halftoning circuit 56 to each other, and further connecting the CPU 60, the ROM 62 and the RAM 64 to each other.

The above-mentioned correction circuit 50 comprises a preprocessing circuit and a CCD correction circuit. The preprocessing circuit is herein intended to compensate noise components by use of mask image signals, these noise components being concomitant with fluctuations in offset error such as a voltage fluctuation and a temperature drift of analog elements of a line sensor, an amplifier and an A/D converter. For example, if an image signal level in the dark fluctuates over a plurality of scan lines, the offset error is compensated per line, thereby stabilizing the signal. Besides, the CCD correction circuit is intended to effect a shading correction for correcting fluctuations (including fluctuations in illumination light) in light receiving quantity which are derived from an unevenness at every pixel of the CCD 38 defined as a solid-state imaging element and also a dark correction for correcting fluctuations (existing also when the light is not incident) in base at each pixel. The light receiving signals of the respective pixels are uniformed in terms of base. For instance, if an original image density is the same, the same image data (image signal) is provided. The above-mentioned shading correction and the dark correction may be carried out while the analog data are still maintained before the light receiving signals in the CCD 38 undergo the A/D conversion in the A/D converter 40. At this time, the CCD correction circuit is provided on the upstream side of signal transmission of the A/D converter 40. Further, the CCD correction circuit may also be disposed in rear of a logarithm converting circuit which will be mentioned later and effects the CCD correction after performing the logarithm conversion.

The scale factor converting circuit 52 is a circuit for converting the main scan directional one-line image data read by the CCD 38 into image signals corresponding to main scan directional pixel densities in accordance with image forming scale factors such as predetermined scale factors of enlargement and contraction. This circuit 52 is capable of setting the one-line image data into a necessary amount of image data by thinning out the image data at a predetermined thin out rate from the main scan directional one-line image data. The scale factor converting circuit 52 thins out, for instance, 7500 pixels of total input image data of one line into approximately 250 pixels equivalent to a 1/30 data quantity during the prescan.

The line memory 58 is required for storing the platen main scan directional effective range one-line image data for executing the original edge detecting method and the density auto-measuring method according to the present invention. The line memory 58 is a memory for storing the one-line image data thinned out by the scale factor converting circuit 52. The one-line image data stored temporarily are read by the CPU 60 from this line memory 58 and employed for a variety of arithmetic processes such as the original edge detection and the density auto-measurement.

The conversion circuit 54 is composed of a logarithm converting circuit for effecting a logarithm conversion of the image signal and a gradation (tone) converting circuit for converting the image signals into image signals corresponding to gradation characteristics (exposure quantity - density characteristics). The conversion circuit 54 is adapted to the conversion into the signals for image recording.

Figure 3:
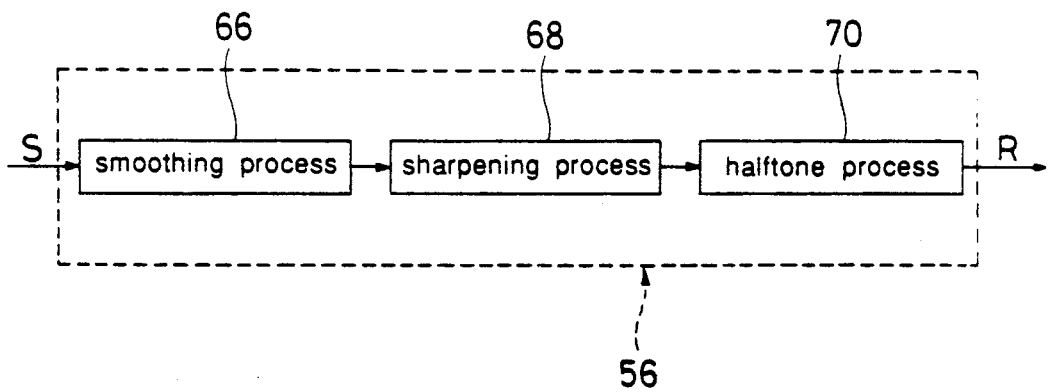
FIG. 3 is a block diagram showing one embodiment of a halftoning circuit of the image processing device depicted in FIG. 2.

The halftoning circuit 56 is, as illustrated in FIG. 3, constructed of a smoothing process circuit 66, a sharpening process circuit 68 and a halftoning process circuit 70. The smoothing process circuit 66 averages input image data and peripheral pixel data. This circuit 66 executes an unsharpness process of the input image data to reduce noises contained in the image data signals, thereby obtaining correction image data.

The sharpening process circuit 68 performs the sharpening process by enhancing the outline and edges of the image. For instance, unsharp masking is executed by subtracting a constant multiple of the smoothed image data from the original image data, and the image sharpness is increased, thereby effecting the edge enhancement.

The half tone process circuit 70 generates a dot image (halftone image) signal from the image density signal. This dot image signal serves to area modulate the image density in accordance with a necessary angle and screen ruling number. This dot image signal is outputted to the image exposure unit 46 of the image recording device 16.

Based on a control sequence stored in the ROM 62, the CPU 60 controls circuits such as the smoothing process circuit 66, the sharpening process circuit 68 and the half tone process circuit 70 of the halftoning circuit 56 in addition to the above-described correction process circuit 50, the scale factor converting circuit 52 and the conversion circuit 54. The CPU 60 also performs a variety of control processes required for image processing and read/write control of multiple data stored beforehand in the RAM 64, the data inputted by the user, the effective image area data in the main scan direction in the case of detecting, e.g., the edges of the original, the data on a main scan directional trimming range, a subscan directional image reading range and a subscan directional trimming range as the necessity arises in addition to the main scan directional effective image range in the case of the density auto-measurement of the original. Thus, the CPU 60 executes the various control processes given above and, at the same time, effects scan reading for detecting the edge or edges of the original of this invention by reading the main scan directional one-line image data from the line memory 58. Further, as discussed above, after reading the main scan directional one-line image data from the line memory 58, the CPU 60 performs main scan directional trimming and subscan directional trimming of the image data according to the necessity. The density auto-measurement (detection of original region, if necessary) according to the present invention is thereby performed.

The printing plate making apparatus 10 for embodying the original edge detecting method and the scan reading method for the density auto-measurement is fundamentally constructed as described above. The following are explanations of the operation thereof and the original edge detection and the density auto-measurement which are executed based on the original scan reading method of this invention.

The explanation will start with the scan reading method for detecting the edge of the original in a first aspect of the present invention.

In the printing plate making apparatus 10 illustrated in FIG. 1, the original G is placed in a predetermined position on the platen 22 and fixed by the platen surface 24. The original G is at first illuminated with the light of the fluorescent lamps 26, 26 disposed in the light source unit 31 movable in the arrowed scan direction a along the underside of the platen 22. Prescan of the original image is then carried out.

The slit-like light emitted from the fluorescent lamps 26, 26 and reflected by the original G is further reflected in a predetermined direction by means of the first mirror 30 which moves integrally with the light source unit 31. Subsequently, the light is reflected in a predetermined direction by the second and third mirrors 32, 34 of the mirror unit 35 which moves at a ½ speed in the same direction with the light source unit 31. The reflected light travels along the light path L. The slit-like light travelling along the light path L and extending in the main scanning direction is image formed on the CCD 38 through the image forming lens 36. The CCD sensor 38 photoelectrically converts the slit light extending in the main scan direction and transmits the one-line analog image data signals Sa to the image processing device 14.

Figure 5:
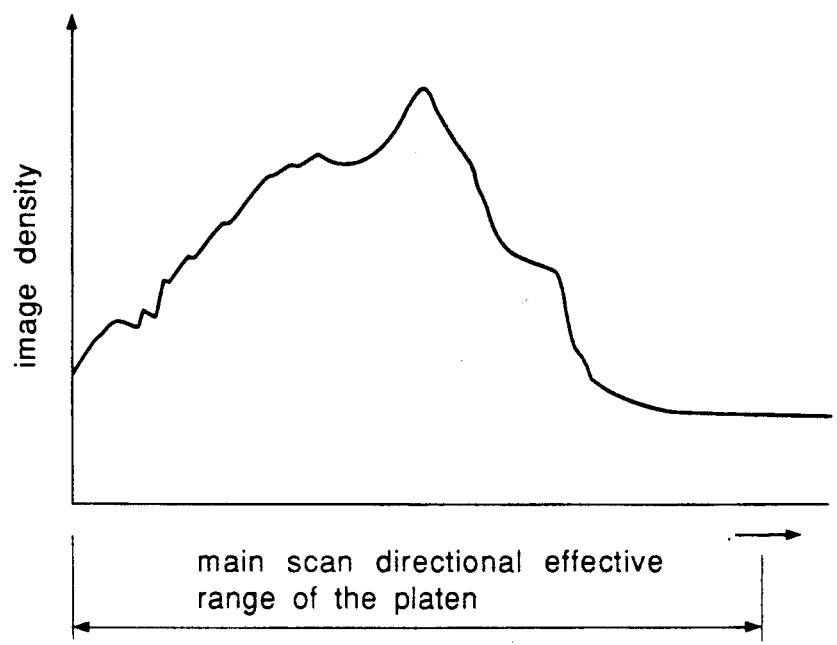
FIG. 5 is a chart showing one example of a main scan directional density distribution obtained by the scan reading method of the original according to the present invention.

In the image processing device 14, the analog image data signals Sa undergo the A/D conversion by the A/D converter 42 and transmitted as digital image signals S to the image processing unit 44. In the image processing unit 44, the image data signals S are subjected to a variety of corrections in the correction process circuit 50 and thinned out at a predetermined thin-out rate in the scale factor converting circuit 52. Thereafter, a predetermined amount of the main scan directional one-line thin-out image data, that is, one-line thin-out image data of the main scan directional effective range of the platen illustrated in, e.g., FIG. 5, are stored in the line memory 58.

Figure 4:
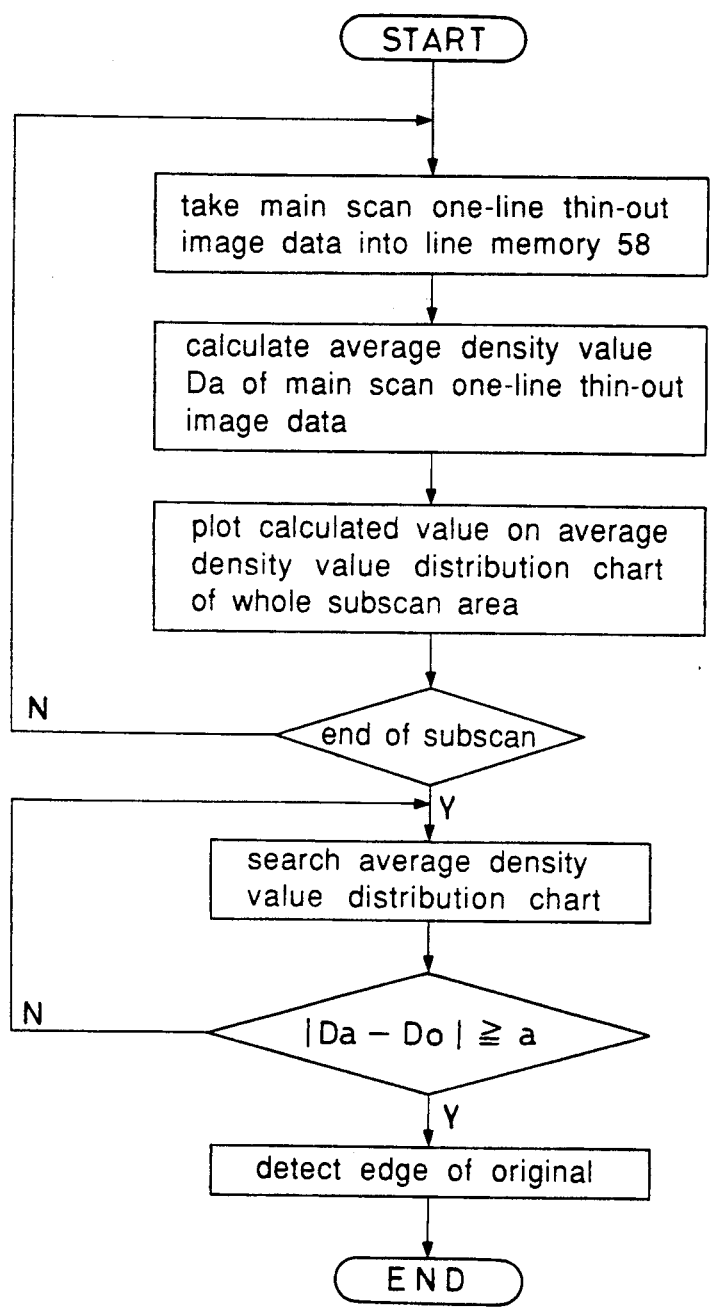
FIG. 4 is a flowchart showing one example of the scan reading method of detecting the edge of the original according to the present invention.

Next, as shown in a flowchart of FIG. 4, the CPU 60 reads the one-line thin-out image data from the line memory 58. The one-line thin-out image data over the main scan directional effective range of the platen are averaged, thereby calculating an average density value Da of the subject line. Thereafter, the CPU 60 causes the RAM 64 to store a corresponding subscan position of the subject line and the average density value Da. The position and the average value are plotted on a subscan directional average density value distribution chart. After this plotting, the next one-line image data are taken into the line memory 58 in the same manner. The CPU 60 similarly completes the above-described average density value distribution chart. Herein, the average density value Da of the subject line may be calculated by averaging not the image data of the main scan directional effective range of the platen which correspond to the entire regions of the platen, but the image data of only the effective image area (range) in the main scan direction, for example, main scan directional trimming range preset from the whole image data as one-line image data to be averaged. Namely, only the image data of the effective image range main scan directional trimming range exclusive of the portion equivalent to the data of the platen cover 24 may be averaged.

The routine described above is repeated substantially over the entire subscan range of the platen 22 from a subscan start position of the light source unit 31 under the platen 22 up to a subscan end position thereof. The CPU 60 thus completes the average density value distribution chart as shown in FIG. 6.

Figure 6:
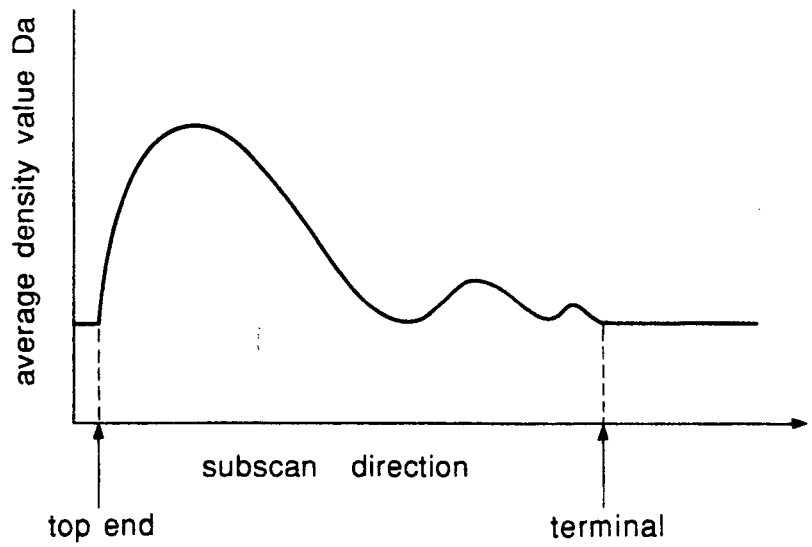
FIG. 6 is a chart showing one example of a subscan directional density average value distribution obtained by the scan reading method of the original according to the present invention.

Upon the end of the prescan, the CPU 60 searches the average density value distribution chart shown in FIG. 6 from the opposite side. In the case of FIG. 6, the search includes a part that is not within the original region and is therefore substantially equal to a density Do of the platen surface 24 which has been previously measured and stored in the RAM 64. Therefore, where an allowance error range is set to Do ±α, at the first part |Da−Do| is smaller than α. Hence, the CPU 60 does not detect it as the original. After a predetermined number of non-original lines continue, the CPU 60 judges that the point at which for the time |Da−Do| is α or greater is the terminal of the original. The edge of the original is thus detected, and the operation is finished.

Upon a detection of the edge of the original, the light source unit 31 temporarily stops in a predetermined position in the vicinity of the terminal, and thereafter the original G undergoes a substantial scan in synchronization with the image recording device 16 from the direction reverse to the prescan. As discussed above, the halftone (dot gradation) image is exposed on the photosensitive material F, thus effecting the reproduction and record.

Explained in the example given above is the case where the average density value distribution chart is searched from the opposite direction to detect only the terminal when the top end of the original is in the preset position. However, if the top end of the original is not preset, the search continues even after detecting the terminal. A possible arrangement is that the CPU 60 is controlled to judge that the line, in which |Da-Do| is less than α, indicates the top end when the predetermined number of lines continue. If the above-described search is performed from the top end of the original, the detecting judgment explained above may be reversed.

Further, the average density value distribution chart is prepared in the example given above. The present invention is not, however, limited to this chart. A variation rate fa of the average density value is obtained by using the average density value Da for several lines which has been obtained by the CPU 60. A distribution chart of this variation rate is completed. The edge or edges of the original may be detected by use of an absolute value |fa| of this variation rate and a predetermined infinitesimal threshold value β (allowance error range) while searching this distribution chart.

In the example given above, the edge or edges of the original are detected by searching the chart after finishing the prescan. Depending on the originals, however, every time the average density value Da during the prescan or the variation rate fa thereof is computed, |Da-Do| is compared with α, or |fa| is compared with β. The edge or edges of the original may be thus detected.

In addition, a density Dm of one line in the main scan direction is compared with the density Do of the platen surface, or alternatively a variation rate fm thereof is obtained. Then, |Dm-Do| is compared with α, or |fm| is compared with β. The edges of the original in the main scan direction are also detectable in this way.

Next, the scan reading method for the density auto-measurement of the original in a second aspect of the present invention will be explained.

In the printing plate making apparatus 10 illustrated in FIG. 1, as in the same way with the first aspect, the line memory 58 of the image processing device 14 stores a predetermined amount of main scan directional one-line image data.

Figure 7:
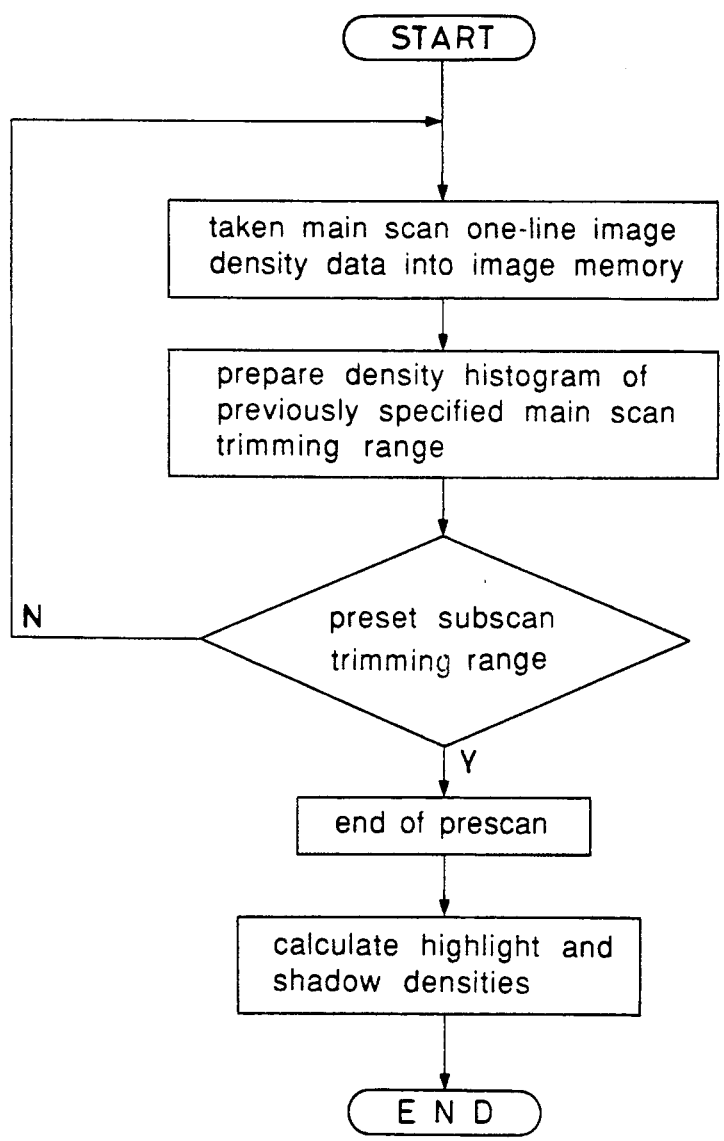
FIG. 7 is a flowchart showing one embodiment of the scan reading method for the density auto-measurement of the original according to the present invention.
Figure 8:
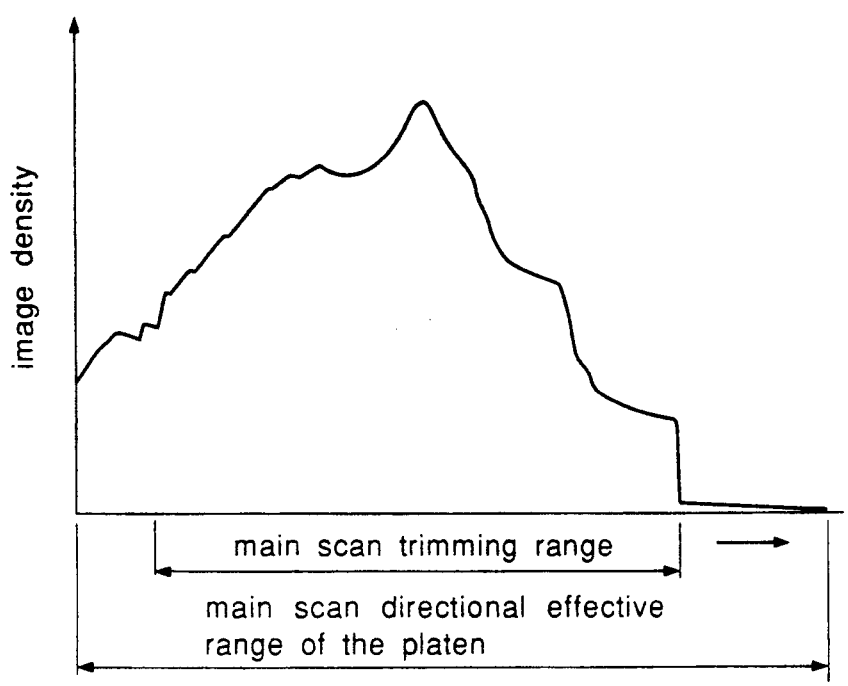
FIG. 8 is a chart showing one example of a main scan directional one-line density distribution obtained by the scan reading method of the original according to the present invention.
Figure 9:
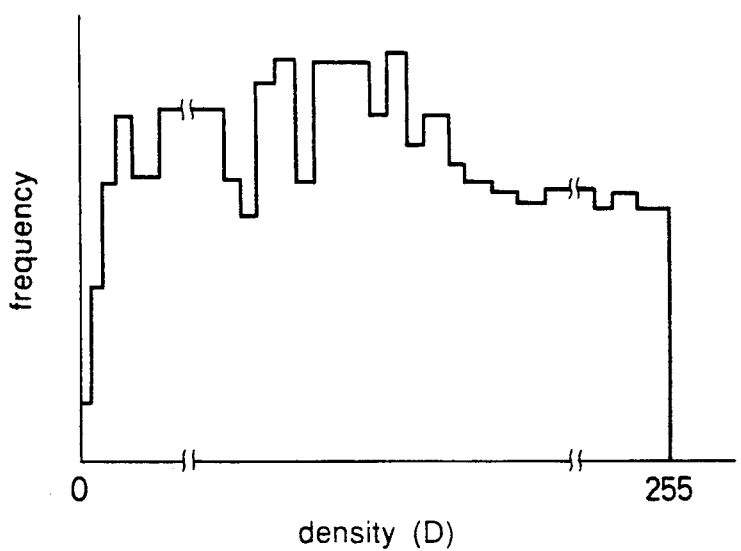
FIG. 9 is a chart showing one example of a main scan directional one-line density histogram obtained by the scan reading method of the original according to the present invention.

Thereafter, as shown in a flowchart of FIG. 7, the CPU 60 reads the one-line image data from the line memory 58. The CPU 60 effects trimming in the main scan direction on the basis of the data of a preset trimming range (area) stored beforehand in the RAM 64. Namely, as illustrated in FIG. 8, the portion equivalent to the data of the platen surface 24 is excluded. A density histogram shown in FIG. 9 is prepared by employing only the image data of a main scan directional trimming range Le which has thus undergone trimming. The histogram is stored in a main memory such as the RAM 64. After this storage, the next one-line image data is similarly taken into the line memory 58. The CPU 60 prepares the above mentioned density histogram in the same manner which will be then stored in the main memory. An interval of the density D in the density histogram prepared herein may, though not particularly limited, consist of 256 segments from 0 to 255, wherein the whole density range is divided into, e.g., 256 segments.

The CPU 60 repeats a preparation routine of the above-described density histogram over the entire range from the image read onset line to the read end line in accordance with the preset subscan directional trimming range data stored in the RAM 64. A density histogram over the entire range is thus prepared.

Upon completeing of the density histogram over the entire trimming range in the subscan direction, the CPU 60 computes a highlight density and a shadow density within the trimming range in the original on the basis of a program stored in the ROM 62 or RAM 64 with the aid of the density histogram. Computed values of the highlight and shadow densities are stored in the main memory such as the RAM 64, thus finishing the density auto-measurement. The computations of the highlight and shadow densities with the aid of the density histogram are not herein particularly limited, and a known conventional method is usable.

For example, a method of obtaining the densities of the highlight and shadow portions from cumulative density histograms may involve the use of the method disclosed in Japanese Patent Laid-Open No. 61579/1988 filed by the present assignee. Based on the method disclosed therein, a density value (level) CH at the highlight point can be given by:

$$\begin{aligned} CH &= t \cdot C2 + (1-t) \cdot C1 \\ &= C2 \cdot (C2 - C3)/(C1 - C3) + \\ & \quad C1 \cdot (C1 - C2)/(C1 - C3) \end{aligned}$$

where C1, C2, C3 are the density values (levels) at such points that frequencies of the histogram obtained are 99%, 95%, 90%, and $t=(C2-C3)/(C1-C3)$.

A density value (level) CL of the shadow point can be given by:

$$\begin{aligned} CL &= s \cdot C5 + (1-s) \cdot C4 \\ &= C5 \cdot (C5 - C6)/(C4 - C6) + \\ & \quad C4 \cdot (C4 - C5)/(C4 - C6) \end{aligned}$$

where C4, C5, C6 are the density values (levels) at such points that the frequencies of the histogram are 1%, 5%, 10%, and $s=(C5-C6)/(C4-C6)$. By the way, if inclinations of curves in the low and high density portions of the histogram obtained are substantially equal to each other, C2 is substantially equal to an intermediate value between C1 and C3, and hence $t=s=\frac{1}{2}$.

Also, $$CH = \frac{1}{2}(C2 + C1)$$

$$CL = \frac{1}{2}(C5 + C4)$$

When the density auto-measurement comes to an end, the prescan (preparatory scan) is finished. The light source unit 31 stopped at the scanning end (right end of the platen 22 in FIG. 1) moves to the left-hand in FIG. 1. The light source unit 31 temporarily stops in a predetermined position vicinal to the terminal of the subscan directional trimming range of the original G which corresponds to the image forming scale factor or the like, i.e., the terminal of the image reading area. Note that if the density auto-measurement range is smaller than the exposure range, the light source unit 31 temporarily stops after reversely moving to the right-hand. Thereafter, the light source unit 31 defined as a scanner performs the substantial scan over the subscan directional trimming range (area) of the original G from right to left (in the direction reverse to the prescan) in FIG. 1 in synchronization with the image recording device 16. The light source unit 31 photoelectrically reads the original image within the whole trimming range with the aid of the CCD 38 of the image reading device 12. Image processing is effected by the image processing device 14 while employing the highlight and shadow densities obtained by the density auto measuring method according to the present invention. In the meantime, the photosensitive material F is exposed in the image recording device 16, and the exposed photosensitive material is processed, thus reproducing and recording the halftone image.

In accordance with the second aspect of the present invention, it is required that the trimming range of the original mounted on the platen be specified beforehand by the user and also stored in the CPU or the like by inputting it through an unillustrated digitizer or keyboard. This trimming range is set by the main scan directional trimming range (main scan trimming range) and the subscan directional trimming range (subscan trimming range). That trimming range serves to set a density auto-measurement trimming range for reading the image by the prescan and an exposure trimming range for reading the image by the substantial scan. That trimming range can be arbitrarily set by the user. With respect to these trimming ranges, the whole original may be set as a trimming range, or alternatively a part of the original may also be set as a trimming range. Further, if a small-sized original is provided, the trimming range can be set larger than the original. However, the density auto measurement trimming range is preferably defined by the whole original or a part of the original.

Figure 10:
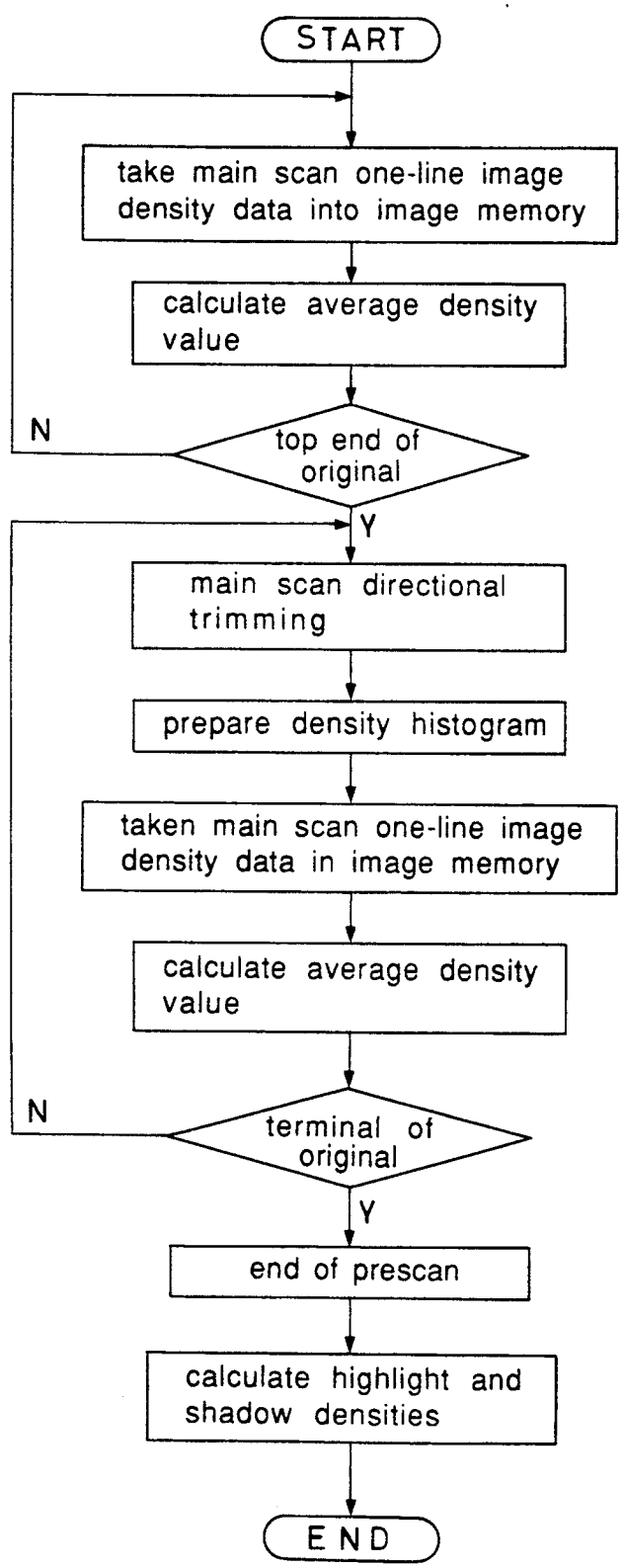
FIG. 10 is a flowchart showing another embodiment of the scan reading method for the density auto-measurement of the original according to the present invention.

Next, in accordance with the density auto-measuring method and the scan reading method for detecting the edge of the original in a third aspect of the present invention, as obvious from a flowchart of FIG. 10, the density histogram is prepared only in the case of falling within the original region or the image reading range. The operation is absolutely the same with the second aspect of the present invention excluding the following three points, and hence the description thereof is omitted. In advance of preparing this density histogram, the average density value (and further the variation rate thereof) is computed; the subscan directional image reading range data are not previously set, while the subscan is effected by the scanner in a subscan range (e.g., substantially in the entire area of the platen 22, or until the terminal is detected) of the light source unit 31 of the image reading device 12; and the top end and the terminal of the original region or the image reading range are detected from the average density value (variation rate).

To begin with, as in the same manner with the first and second aspects, the main scan directional one-line image density data are taken into the line memory. The image density data stored in this line memory are averaged with respect to the effective image range in the main scan direction. The average density value Da is thereby calculated. For instance, as illustrated in FIG. 8, the prescan onset portion is not within the original range and is therefore substantially equal to the density Do of the platen surface 24 which has been previously measured and stored in the RAM 64. Hence, in this case, it is assumed that the allowance error range is Do$\pm\alpha$, at the first part $|Da-Do|$ is smaller than a. Therefore, in this instance, the CPU 60 does not detect it as the top end of the original. If the line concerned does not indicate the top end of the original, the next one-line image density data are taken into the line memory. The density average value Da of this line is then obtained, and the top end of the original is detected. With a repetition of this routine, after a predetermined number of non-original lines having continued, the point at which for the first time $|Da-Do|$ is $\alpha$ or greater is judged as an original region. The top end of the original is thus detected.

Upon a detection of the top end of the original, the operation exits the above-described routine. The main scan directional trimming of the image density data of the subject line is performed. Next, a density histogram is prepared from the image data which has undergone trimming and then stored in the main memory.

Thereafter, the next main scan directional one-line image density data are taken into the line memory. As discussed above, the average density value Da of this line is calculated. Herein, as shown in, e.g., FIG. 6, the average density value Da is different from the platen surface density Do in the original region, and $|Da-Do|$. On the other hand, even if Da is almost equal to Do within the original region—i.e., $|Da-Do|<\alpha$, this does not continue over a plurality or multiplicity of lines. Hence, in such a case, the CPU 60 does not detect it as a terminal of the original. If the line concerned does not indicate the terminal of the original, the operation returns to main scan directional trimming of the subject image density data of the line. After this trimming, as explained above, until the terminal of the original is detected, there is repeated a routine of preparing a density histogram with respect to the interior of this main scan directional trimming range, taking in the next main scan directional one-line image density data, calculating the average density value and judging the terminal of the original. Now, when a predetermined number of such lines continue as to establish $|Da-Do|<\alpha$, it is judged that these several lines indicate the original region. The first (or last) line of these several lines is detected as the terminal of the original. Immediately after detecting the terminal of the original, or when the light source unit moves up to the subscan end position under the platen 22, the prescan is finished.

As described above, the judgment of the top end or terminal of the original from the foregoing density average value and also the preparation of the density histogram are repeated over the predetermined or substantially entire subscan range of the platen 22 from the subscan start position of the light source unit 31 under the platen 22 up to the terminal of the original or the subscan end position thereof. The CPU 60 completes the density histogram of the original region from the top end to the terminal of the original.

Upon an end of the prescan, the CPU 60 computes the highlight and shadow densities in the manner described above by using the density histogram obtained herein. Thus, the density auto-measurement according to this invention is finished.

When finishing the density auto-measurement, as in the same way with the first and second aspect discussed above, the light source unit 31 temporarily stops in the predetermined position in close proximity to the terminal of the original G. Thereafter, the original G is subjected to the substantial scan from the direction opposite to the prescan in synchronization with the image recording device 16. As described above, the dot gradation image is exposed on the photosensitive material F, thereby performing the record and reproduction.

Now, in the example give above, the top end and terminal of the original are judged by use of the average density value Da. The present aspect is not, however, limited to this. As in the same manner with the first aspect, the variation rate fa of the average density value is obtained by use of the average density value Da for several lines which has been obtained by the CPU 60. It is permitted that the top end and terminal of the original are detected by employing the predetermined infinitesimal threshold value $\beta$ (allowance error range) and the absolute value $|fa|$ of this variation rate.

Obtained in the example described above is an additive average of the density data taken for one line in the main scan direction. If the average density value Da is a certain density value Do ($|Da-Do|<\alpha$, or variation rate $|fa|<\beta$), this line is not judged as the original region. Depending on the distribution state of the one-line density data, however, the average density value Da happens to coincide with the predetermined density value Do. For this reason, the detection of the terminal portion of the original becomes inaccurate. It is necessary to compare the several line average density value Da to enhance the accuracy of detection. A maximum density value Dmax and a minimum density value Dmin in the main scan one-line density data are then obtained. A value of $|Dmax-Dmin|$ is compared with a preset value, e g., an empirical value Dt. When $|Dmax-Dmin|<Dt$ and $|Da-Do|<\alpha$ (or $|fa|<\beta$), it is judged that this one line does not indicate the original region. With this arrangement, it is possible to judge the edge or edges and region of the original more surely and accurately.

Further, the example explained above has dealt with the case where both the top end and terminal of the original are detected from the average density value Da. If the top end of the original is in the preset position, the construction may be given to detect only the terminal of the original.

Besides, in this aspect also, main scan directional trimming (effective image range) is detectable by comparing a main scan directional one-line density Dm with the platen surface density Do or obtaining a variation rate fm thereof and further comparing $|Dm-Do|$ with $\alpha$ or $|fm|$ with $\beta$.

In accordance with a third aspect of the present invention, the main scan directional effective image range when obtaining the average density value may be a main scan directional effective range of the platen, or a range from one end to the other end of the original, or a range in which the image actually exists in the original, or a range inclusive of the original and preset by the device. Besides, the main scan trimming range when obtaining the density histogram in this mode may be a range specified by the user as shown in the above-mentioned second aspect of the present invention, or a range preset by the device, e.g., an original full-size.

According to the embodiments discussed above, in any aspect, the prescan range is substantially equal to or slightly larger than the image forming range. The present invention is not, however, limited to this range. The prescan range may be a part of the image forming range or a part of range of the original.

As fully discussed above, in accordance with the first aspect of the present invention, the main scan one-line image data photoelectrically read during the prescan are averaged in the main scan direction, thereby obtaining the average density value or the variation rate thereof. Using this value and variation rate, the edges, i.e., the top end and terminal of the original or both ends thereof are detected. Hence, even the size is not fixed, it is possible to automatically detect the edge or edges of the original at low costs with a high accuracy without fitting new parts such as a sensor, etc.

Furthermore, in accordance with the second aspect of the present invention, the density histogram is prepared per line after taking the main scan one-line image data photoelectrically read during the prescan into the line sensor having a small memory size. The density histogram over the previously specified whole trimming range is also prepared or whole image reading range. Thereafter, the highlight and shadow densities are computed. It is therefore unnecessary to have a large capacity size buffer memory for taking in all the data of a sheet of original or several lines as done in the prior art. The density auto-measurement is attainable at low costs.

Still further, in accordance with the third aspect of the present invention, the following effects in addition to the above-mentioned are exhibited. The average density value or the variation rate thereof is obtained by averaging the main scan directional one-line image data employed for preparing the above-described density histogram. By employing these value and rate, at least one edge, i.e., the top end or terminal of the original or both ends thereof are detected. Hence even if the size is not fixed, it is possible to automatically detect the edge or edges of the original at the low costs with the high accuracy with out attaching the new parts such as the sensor, etc.

Therefore, the image forming apparatuses such as the copying apparatus and the printing plate making apparatus to which the methods of the present invention are to be applied exhibit a remarkably good operability to the user.

Although the illustrative embodiments of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A scan reading method in an image reader for detecting an edge of an original, the image reader including a platen with the original mounted thereon, and a scanner including a light source for illuminating said original sequentially or simultaneously in a main scan direction while being relatively moved in a subscan direction substantially orthogonal to said main scan direction, wherein an image of said original is photoelectrically read at each pixel by two-dimensionally scanning said original, and detecting at least one edge of said original in said subscan direction, said method comprising the steps of:

taking one-line image density data in said main scan direction of said scanner in a predetermined position in said subscan direction;

averaging said one-line image density data in said main scan direction to determine an average density value of said line by:

plotting said average density value in said subscan position on a density distribution chart in said subscan direction;

repeating the plotting process from a subscan start point on the side of one end of said platen to a subscan end point on the side of the other end thereof in accordance with the scanning operation by said scanner;

obtaining said density distribution chart in said subscan direction;

searching thereafter said density distribution chart; and detecting at least one edge of said original by determining where a line having an average density value which is less than a predetermined threshold value is positioned outside of an original region.

2. The scan reading method according to claim 1, wherein said one-line image density data in said main scan direction are image density data which are thinned out by a predetermined method.

3. The scan reading method according to claim 1, wherein said one-line image density data in said main scan direction are image density data within an effective image area in said main scan direction.

4. The scan reading method according to claim 1, wherein at least one-line of a first line in which said average density value is less than said threshold value after a plurality of lines having an average density value less than said threshold value have continued, and a first line in which said average density value is less than said threshold value after a plurality of lines having an average density value equal to at least said threshold value have continued, is detected as the edge portion of said original.

5. The scan reading method according to claim 1, wherein a predetermined number of lines having an average density value which is less than said threshold value continue are judged as an area being out of the original region so as to detect the edge portion of said original.

6. A scan reading method in an image reader for detecting an edge of an original, the image reader including a platen with the original mounted thereon, and a scanner including a light source for illuminating said original sequentially or simultaneously in a main scan direction while being relatively moved in a subscan direction substantially orthogonal to said main scan direction, wherein an image of said original is photoelectrically read at each pixel by two-dimensionally scanning said original, and detecting at least one edge of said original in said subscan direction, said method comprising the steps of:

taking one-line image density data in said main scan direction of said scanner in a predetermined position in said subscan direction;

averaging said one-line image density data in said main scan direction to take average density value of said line by:

calculating a variation rate of said line or one of a plurality of lines provided in front of said line by using said average density value data of a predetermined number of lines;

repeating the calculation from a subscan start point on the side of one end of said platen to a subscan end point on the side of the other end thereof in accordance with the scanning operation by said scanner;

completing a distribution chart of said variation rate with respect to said subscan position;

searching thereafter said variation rate distribution chart; and detecting the edges of said original by determining where a line having an absolute value of said variation rate is less than a predetermined infinitesimal value is out of the original region.

7. The scan reading method according to claim 6, wherein said one-line image density data in said main scan direction are image density data which are thinned out by a predetermined method.

8. The scan reading method according to claim 6, wherein said one-line image density data in said main scan direction are image density data within an effective image area in said main scan direction.

9. The scan reading method according to claim 6, wherein at least one of a first line in which said absolute value of said variation rate exceeds said infinitesimal value after a plurality of lines having an absolute value of said variation rate is less than said infinitesimal value have continued, and a first line in which said absolute value is less than said infinitesimal value after a plurality of lines having an absolute value of said variation rate equals at least said infinitesimal value have continued, is detected as the edge portion of said original.

10. The scan reading method according to claim 6 wherein a predetermined number of lines having an absolute value of said variation rate is less than a predetermined infinitesimal value continue, are judged as an area being out of the original region so as to detect the edge portion of said original.

11. A scan reading method in an image reader for computing a density auto-measurement, the image reader including a scanner for automatically measuring an original image density by executing a prescan in a subscan direction by reading a one-line image density of an original mounted on a platen at each pixel in a main scan direction, said method comprising the steps of:

taking into a line memory, one-line image density data in said main scan direction which have been photoelectrically read by said scanner;

preparing a density histogram of said image density data of a previously specified main scan trimming range from said one-line image density data taken into said line memory;

storing said histogram in a main memory;

repeating the storage process with respect to a previously specified subscan trimming range to complete said histogram of the entire subscan trimming range; and calculating thereafter highlight and shadow densities by use of said histogram.

12. The scan reading method according to claim 11, wherein said one-line image density data in said main scan direction are image data which are thinned out by a predetermined method.

13. A scan reading method in an image reader for computing a density auto-measurement, the image reader including a scanner for automatically measuring an original image density by executing a prescan in a subscan direction by reading a one-line image density of an original mounted on a platen at each pixel in a main scan direction, said method comprising the steps of:

taking, into a line memory, one-line image density data in said main scan direction which have been photoelectrically read by said scanner;

calculating an average density value of said line by averaging said one-line image density data taken into said line memory with respect to an effective image area in said main scan direction;

making a discrimination of an original region from said average density value;

trimming said one-line image density data taken into said line memory in said main scan direction when said line is within said original region;

preparing thereafter a density histogram of said image density data of said main scan trimming range;

storing said density histogram in a main memory;

repeating the storage process with respect to said entire original region to complete said histogram of the entire original region;

calculating thereafter highlight and shadow densities by use of said histogram; and detecting at least one edge of said original.

14. The scan reading method according to claim 13, wherein said one-line image density data in said main scan direction are image density data which are thinned out by a predetermined method.

15. The scan reading method according to claim 13, wherein said original region is detected by judging that a line in which said average density value is less than a predetermined density value, or an absolute value of a variation rate of said average density value is less than a predetermined infinitesimal value, is out of the original region.

16. The scan reading method according to claim 13 wherein a predetermined number of lines having an average density value which is less than said predetermined density value, or having an absolute value of said variation rate of said density average value which is less than said predetermined infinitesimal value continue are judged as an area being out of the original region.

17. The scan reading method according to claim 13, wherein when the difference between a maximum value and a minimum value of said one-line image density data is smaller than predetermined values, and when said average density value of said one line is less than said predetermined density values, or said absolute value of said variation rate of said average density value of said one-line is less than said predetermined infinitesimal value, said one-line is judged as being out of the original region.

18. The scan reading method according to claim 13, wherein said main scan directional trimming range is determined from said main scan one-line image density data value at each pixel within said line memory by eliminating pixel points at which said image density data value is less than said predetermined density value, or said absolute value of said variation rate of said image density data value is less than said predetermined infinitesimal value.

19. The scan reading method according to claim 13, wherein said main scan directional trimming range is determined depending on a first pixel point at which said image density data value becomes larger than said predetermined density value, or an absolute value of said image density data value is larger than said predetermined infinitesimal value, and a first pixel point at which said data value is less than said predetermined density value, or said absolute value is less than said predetermined infinitesimal value.

* * * * *